United States Patent
Hwang

(10) Patent No.: US 6,495,087 B1
(45) Date of Patent: Dec. 17, 2002

(54) PREPARATION OF THERMAL CONTRACTION SLEEVE

(75) Inventor: Bong-Ik Hwang, Ansan (KR)

(73) Assignee: Chunma Corporation, Seoul (KR)

(*) Notice: Subject to any disclaimer, the term of this patent is extended or adjusted under 35 U.S.C. 154(b) by 413 days.

(21) Appl. No.: 09/584,080

(22) Filed: Jun. 1, 2000

(30) Foreign Application Priority Data

Mar. 15, 2000 (KR) ........................................ 2000-13091

(51) Int. Cl.$^7$ .............................................. B29C 47/06
(52) U.S. Cl. ................ 264/477; 264/495; 264/171.13; 264/173.1; 156/244.17
(58) Field of Search ............................. 264/477, 495, 264/171.13, 173.1, 211.21; 156/82, 86, 244.17; 174/DIG. 8

(56) References Cited

U.S. PATENT DOCUMENTS

| | | | |
|---|---|---|---|
| 4,472,222 A | * | 9/1984 | Moisson et al. ............. 156/49 |
| 4,761,193 A | * | 8/1988 | Pithouse et al. ............ 156/85 |
| 4,803,104 A | * | 2/1989 | Peigneur et al. ........... 138/110 |
| 4,816,326 A | * | 3/1989 | Jones et al. ............. 156/272.2 |
| 4,820,561 A | * | 4/1989 | Pithouse et al. ........... 428/34.5 |
| 4,944,987 A | * | 7/1990 | Cordia et al. ............ 138/156 |
| 5,000,228 A | * | 3/1991 | Manent et al. ............. 138/110 |
| 5,002,822 A | * | 3/1991 | Pithouse et al. ......... 156/272.2 |
| 5,186,989 A | * | 2/1993 | Tsukada et al. ............. 156/290 |
| 5,215,607 A | * | 6/1993 | Read et al. ................ 156/248 |
| 5,236,765 A | * | 8/1993 | Cordia et al. .............. 138/156 |
| 5,366,771 A | * | 11/1994 | Beersel et al. ............ 428/34.9 |
| 5,599,418 A | * | 2/1997 | Pithouse et al. ......... 156/273.3 |

FOREIGN PATENT DOCUMENTS

EP 0273224 A1 1/1984 .......... B29C/61/06

* cited by examiner

*Primary Examiner*—Mark Eashoo
(74) *Attorney, Agent, or Firm*—Jacobson Holman PLLC

(57) ABSTRACT

A preparation of thermal contraction sleeve is disclosed. In this method, polyethylene fibers are elongated by 850%~1,200% and are exposed to a radiation of 2.5~3.5 Mrads, thus being cross-linked. The first surface of a fabric sheet, made of the polyethylene fibers, is exposed to a voltage of 20,000~25,000 V while passing over a plurality of rollers, thus being modified at the first surface. A first matrix sheet, melt-extruded at a temperature of 300° C.~380° C., is formed on the modified first surface of the fabric sheet, prior to an integration of the first matrix sheet with the modified surface of the fabric sheet. The integration is accomplished by a first elastic roller and a first cooling roller. The second surface of the fabric sheet is processed in the same manner as that described above. A second matrix sheet is layered on the modified second surface of the fabric sheet, thus forming a fabric-matrix layered body. The matrix sheets of the fabric-matrix layered body are exposed to a radiation of 2.5~3.5 Mrads, thus being cross-linked.

5 Claims, 1 Drawing Sheet

PREPARATION OF THERMAL CONTRACTION SLEEVE

BACKGROUND OF THE INVENTION

1. Field of the Invention

The present invention relates, in general, to a reparation of thermal contraction sleeve and, more particularly, to a method of producing thermal shrinkable sleeves while increasing the adhesive force between the fabric sheet and the matrix sheet of a fabric-matrix layered thermal shrinkable sleeve and improving the production yield of the sleeves.

2. Description of the Prior Art

As well known to those skilled in the art, a variety of sealing elements have been used for the protection of joints of communication cables or electric wires from environmental impact or contamination. An example of conventionally used sealing elements for such joints is a thermal shrinkable sleeve made of polymeric materials.

Korean Patent No. 48,450, owned by Raychem Corporation of USA, discloses a representative example of such conventional polymeric thermal shrinkable sleeves. The polymeric thermal shrinkable sleeve, disclosed in the above Korean patent, uses high density polyethylene as a polymeric material, and has a matrix sheet. The elastic fabric sheet, set within the matrix sheet, is made of cross-linked polyethylene exposed to a radiation of 4~40 Mrads, while the matrix sheet is made of cross-linked polyethylene exposed to a radiation of not higher than 10 Mrads.

The above polymeric thermal shrinkable sleeve is advantageous in that it has a high shrinkage and is free from an undesired breakage of the elastic fabric sheet or the matrix sheet during a contraction of the sleeve, and accomplishes a desired pressure sealing effect for the joints of cables or wires.

However, the above sleeve is problematic in that the adhesive force between the elastic fabric sheet and the matrix sheet is somewhat low, thus sometimes allowing an unexpected separation of the fabric sheet from the matrix sheet. In addition, the process of producing the above sleeves undesirably consumes time and increases the production cost of such sleeves. The unexpected separation of the elastic fabric sheet from the matrix sheet may be prevented by an application of an expensive adhesive to the junction between the two sheets. However, the application of such an expensive adhesive to the junction between the sheets increases the production cost of the polymeric thermal shrinkable sleeve and complicates the process of producing the sleeves. Such a complex sleeve production process increases the cost of the sleeve production system.

SUMMARY OF THE INVENTION

Accordingly, the present invention has been made keeping in mind the above problems occurring in the prior art, and an object of the present invention is to provide a method of producing thermal shrinkable sleeves, which increases the adhesive force between the fabric sheet and the matrix sheet of a fabric-matrix layered thermal shrinkable sleeve.

Another object of the present invention is to provide a method of producing thermal shrinkable sleeves while improving the production yield of the sleeves.

A further object of the present invention is to provide a method of producing thermal shrinkable sleeves, which produces inexpensive thermal shrinkable sleeves while reducing the production loss.

In order to accomplish the above object, the present invention provides a method of producing a thermal shrinkable sleeve, comprising the steps of: a)exposing polyethylene fibers elongated by 850%~1,200% to a radiation of 2.5~3.5 Mrads, thus cross-linking the polyethylene fibers; b)exposing the first surface of a fabric sheet made of the polyethylene fibers to a voltage of 20,000~25,000 V while passing the fabric sheet over a plurality of rollers, thus modifying the first surface of the fabric sheet, and forming a first matrix sheet, melt-extruded at a temperature of 300° C.~380° C., on the modified first surface of the fabric sheet, and integrating the first matrix sheet with the modified surface of the fabric sheet by allowing the fabric sheet with the first matrix sheet to pass through the nip between a first elastic roller and a first cooling roller; c)processing the second surface of the fabric sheet through the same process as that of step "b" and integrating a second matrix sheet with the modified second surface of the fabric sheet, thus forming a fabric-matrix layered body; and d)exposing the matrix sheets of the fabric-matrix layered body to a radiation of 2.5~3.5 Mrads, thus cross-linking the matrix sheets.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
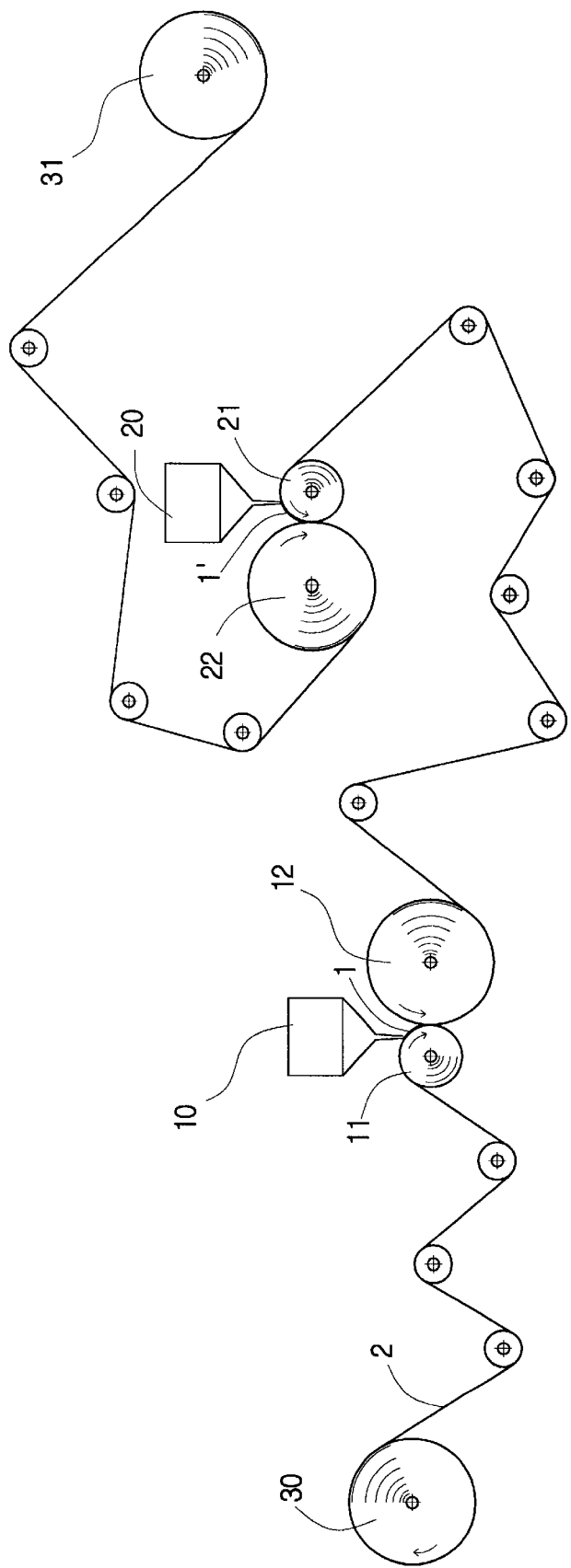
FIG. 1 is a view, showing the process of producing the thermal shrinkable sleeves in accordance with the present invention.

FIG. 1 shows the process of producing the thermal shrinkable sleeves in accordance with the present invention.

As shown in the drawing, a fabric sheet 2, interposed between two matrix sheets, or first and second matrix sheets 1 and 1', is produced through a weaving process, which uses polyethylene fibers, elongated by 850%~1,200% and exposed to a radiation of 2.5~3.5 Mrads so as to be cross-linked, as warps and non-shrinkable fibers, such as glass fibers, as wefts. The resulting fabric sheet 2 from the weaving process is only shrinkable in one direction.

When the radiation dose for the polyethylene fibers in the above process exceeds the above-mentioned range, it is undesirably necessary to exceedingly lengthen the radiation time with the increase in shrinkage of the resulting fabric sheet 2 caused by the increase in the radiation dose being almost negligible. For example, an exposure of the polyethylene fibers to a radiation of 10 Mrads reduces productivity of the fabric sheets by about 50%~300% in accordance with the thickness of a desired fabric sheet in comparison with an exposure of the polyethylene fibers to a radiation of 3 Mrads.

The fabric sheet is, thereafter, fed from a winder 30 and passes over a plurality of feeding rollers while being exposed to a high voltage of 20,000~25,000 V at its first surface, thus being modified on the first surface, with micro pores being formed on the first surface. Due to the micro pores, the adhesive force of the fabric sheet relative to another sheet, or a matrix sheet, is desirably increased. The fabric sheet 2, with its first surface having the pores, is integrated with a first matrix sheet 1, melt-extruded from a first extrusion die 10, on the modified first surface prior to passing through the nip between a first elastic roller 11 and a first cooling roller 12. In such a case, the elastic roller 11 is made of an elastic material, such as rubber, and compresses the matrix sheet 1, thus allowing a part of the polymer of the matrix sheet 1 to be infiltrated into the fabric sheet 2 and integrating the matrix sheet 1 with the fabric sheet 2.

Since the fabric sheet 2 is integrated with the first matrix sheet 1 as described above, it is possible to effectively prevent an unexpected separation of the fabric sheet from the matrix sheet during a process of installing a resulting sleeve to a joint of cables or wires. In order to prevent an undesired contraction of the hot melted matrix sheet integrated with the fabric sheet, the cooling roller 12 is kept at a temperature of 5~20° C. and effectively sets the matrix sheet 1 layered on the first surface of the fabric sheet 1. Therefore, a primary fabric-matrix layered body is prepared.

The fabric-matrix layered body from the cooling roller 12 passes over a plurality of feeding rollers while being exposed to a high voltage at the second surface of the fabric sheet 2 in the same manner as that described for the first surface of the sheet 2, thus being modified at the second surface. The fabric sheet 2, having pores on its second surface, is integrated with a second matrix sheet 1', melt-extruded from a second extrusion die 20, on the modified second surface prior to passing through the nip between a second elastic roller 21 and a second cooling roller 22. The two matrix sheets 1 and 1' are thus firmly integrated with the fabric sheet 2 interposed between them without using a separate adhesive, thus forming a final fabric-matrix layered body. The two matrix sheets 1 and 1' of the final fabric-matrix layered body are exposed to a radiation of 2.5~3.5 Mrads, thus being cross-linked.

In a brief description, the process of this invention produces a desired fabric-matrix layered body by layering first and second matrix sheets, extruded from associated extrusion dies, on the opposite surfaces of a fabric sheet, and allowing the fabric sheet with the matrix sheets to pass through the nip between an elastic roller and a cooling roller so as to firmly integrate the matrix sheets with the fabric sheet. The process of this invention is thus simplified and remarkably reduces the production loss in comparison with a conventional process, in which a fabric sheet and two matrix sheets are separately prepared and are integrated into a desired layered body using an adhesive applied at the junctions between the fabric sheet and the matrix sheets.

The term "production loss" means the surplus parts of one or more sheets of a final fabric-matrix layered body, with the surplus parts being formed by a difference in length of the sheets and being cut and removed from the effective parts of the sheets determined by the length of a shortest one of the fabric and matrix sheets. The conventional process is inevitably accompanied by such a production loss as different temperatures and different pressures are applied to the three sheets while integrating the three sheets into a single body. Such a production loss includes glass fibers used in the fabric sheet, and so the loss cannot be recycled, but is only discarded as an industrial waste contaminating the environment.

In the drawing, the reference numeral 31 denotes a rewinder.

A better understanding of the present invention may be obtained through the following examples which are set forth to illustrate, but are not to be construed as the limit of the present invention.

EXAMPLE 1

Preparation of Fabric Sheet

High-density polyethylene, having a density of 0.930 and a melt index of 9.8, was extruded at a temperature of 360° C. to form fibers having a diameter of 1.0~2.0 mm. The polyethylene fibers were, thereafter, cooled in cold water of 40° C temperature, and were exposed to a radiation of 3 Mrads, thus being cross-linked.

The cross-linked polyethylene fibers were elongated by 950% and were aged for two days at room temperature. A fabric sheet was produced by weaving the aged polyethylene fibers as warps (11/inch) with glass fibers as wefts (43/inch). The shrinkages of the resulting fabric sheet are given in Table 1.

TABLE 1

| Contents | Shrinkage with 200° C. Hot Air for 1 minute | | | | |
|---|---|---|---|---|---|
| Load(g) | 0 | 2 | 4 | 10 | 15 |
| Shrinkage(%) | 88.50 | 87.05 | 84.60 | 75.00 | 65.25 |

*The shrinkages, shown in Table 1, were measured as averages from a measurement of five test samples, having a thickness of 0.35 mm, after a cross-linking elongation process of the fibers.

EXAMPLE 2

Preparation of Fabric-Matrix Layered Body

The fabric sheet from Example 1 passed over a plurality of feeding rollers as shown in FIG. 1 while being exposed to a high voltage of 20,000~25,000 V at its first surface, thus being modified on the first surface. The fabric sheet was, thereafter, integrated with a first matrix sheet 1, melt-extruded from a first extrusion die 10, on its first surface prior to passing through the nip between a first elastic roller and a first cooling roller. After the integration of the first matrix sheet with the first surface of the fabric sheet, the fabric sheet was modified by an exposure of its second surface to a high voltage, and was integrated with a second matrix sheet 1', melt-extruded from a second extrusion die 20, on the modified second surface prior to passing through the nip between a second elastic roller and a second cooling roller, thus forming a desired fabric-matrix layered body with the fabric sheet 2 being interposed between the two matrix sheets 1 and 1'.

The fabric-matrix layered body, with the fabric sheet 2 interposed between the two matrix sheets 1 and 1', was cross- linked by an exposure to a radiation of 2.5 ~3.5 Mrads, thus forming a final product (thermal shrinkable sleeve). The shrinkages of the final product are given in Table 2, while the other physical performances of the final product are given in Table 3.

TABLE 2

| Contents | Shrinkage with 200° C. Hot Air for 15 minutes | | | | |
|---|---|---|---|---|---|
| Load(g) | 0 | 100 | 200 | 500 | 1000 |
| Shrinkage(%) | 73 | 71 | 70 | 68 | 60 |

*The shrinkages of the final sleeve product, shown in Table 2, were measured as averages from a measurement of five test samples, having a size of 15 mm × 20 mm.

COMPARATIVE EXAMPLE 1

Preparation of Fabric-Matrix Layered Body Using Adhesive

A matrix sheet was primarily prepared through an extrusion process of thermally melted high-density polyethylene.

The surface of the matrix sheet was, thereafter, coated with a urethane-based two component adhesive of 10~30 g/m², with the organic solvent component of the adhesive layer being dried by hot air of 80~100° C. The above matrix sheet was integrated with the fabric sheet of Example 1 through an adhesion process prior to being cross-linked and being aged for 48~72 hours within an ageing room of 40~50° C.

The physical performances of the final product are given in Table 3.

COMPARATIVE EXAMPLE 2

Preparation of Fabric-Matrix Layered Body Through Thermal Compression

A matrix sheet was prepared in the same manner as that described for Comparative Example 1. The matrix sheet was layered on the fabric sheet of Example 1, with thermally melted high-density polyethylene of 300° C being applied to the junction between the fabric sheet of Example 1 and the matrix sheet. The fabric sheet, with the matrix sheet, instantaneously passed through the nip of press rolls, and so the matrix sheet was cross-linked and integrated with the fabric sheet through a thermal compression process.

The physical performances of the final product are given in Table 3.

TABLE 3

| Contents | Com. Ex.1 | Com. Ex.2 | Ex.2 |
| --- | --- | --- | --- |
| Process*[1] | 3 | 2 | 1 |
| Ageing time | 48~72 | 0 | 0 |
| Adhesive force | ≦1.2 kg/15 mm | No separation | No separation |
| Solvent*[2] resistance | Sheet separation within 1 hr. | Sheet separation within 3 hrs. | no sheet separation |
| Cost*[3] | 1.7 | 1.3 | 1 |
| Productivity | Bad | Ordinary | Good |
| Loss*[4] | 30% | 10% | 0 |

Testing was carried out at room temperature.
*[1] and *[3] show comparative values of the final products of Comparative Examples 1 and 2 when setting the value of the final product of Example 2 to a reference value of 1.
*[2]shows sheet separation occurring in the course of time after final products were immersed in a toluene.
*[4]shows comparative values of the final products of Comparative Examples 1 and 2 when setting the value of the final product of Example 2 to a reference value of zero.

COMPARATIVE EXAMPLE 3

The fabric sheet from Example 1 was processed in the same manner as that described in Example 2 without modifying any surface of the fabric sheet, thus producing a final product. The shrinkage and production loss of the final product are given in Table 4.

TABLE 4

| Contents | Adhesive force | Loss | shrinkage |
| --- | --- | --- | --- |
| Ex.2 | Good (no separation) | 0 | The same as Table 2 |
| Com. Ex.3 | Bad | Low competitiveness due to low adhesive force | Impossible to measure |

Testing was carried out at room temperature.

As described above, the present invention provides a method of producing thermal shrinkable sleeves. This method effectively produces desired thermal shrinkable sleeves, having a high shrinkage, through a simple process while increasing productivity of such sleeves. This method also remarkably increases the adhesive force between the fabric sheet and the matrix sheet of the sleeves without using any separate adhesive. Another advantage of the method of this invention resides in that it remarkably reduces the production loss of the sleeves. This method thus improves the production yield of such sleeves.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A preparation of thermal contraction sleeve consisting of a thermal shrinkable fabric sheet and a thermal shrinkable matrix sheet, comprising the steps of:

a) exposing polyethylene fibers elongated by 850%~1,200% to a radiation of 2.5~3.5 Mrads, thus cross-linking the polyethylene fibers;

b) exposing a first surface of a fabric sheet made of said polyethylene fibers to a voltage of 20,000~25,000 V, thus modifying the first surface of the fabric sheet, and forming a first matrix sheet, melt-extruded from a first extrusion die, on said modified first surface of the fabric sheet, and setting the first matrix sheet on the modified surface of the fabric sheet by allowing the fabric sheet with the first matrix sheet to pass through a nip between a first elastic roller and a first cooling roller;

c) modifying a second surface of said fabric sheet through the same process as that of step "b" and forming a second matrix sheet, melt-extruded from a second extrusion die, on said modified second surface of the fabric sheet and setting the second matrix sheet on the modified second surface of the fabric sheet by allowing the fabric sheet to pass through a nip between a second elastic roller and a second cooling roller, thus forming a fabric-matrix layered body; and exposing the first and second matrix sheets of said fabric-matrix layered body to a radiation of 2.5~3.5 Mrads, thus cross-linking said matrix sheets.

2. The preparation according to claim 1, wherein said fabric sheet is produced by weaving high-density polyethylene fibers and non-shrinkable fibers.

3. The preparation according to claim 1, wherein said first matrix sheet setting step and said second matrix sheet setting step are performed continuously without having any intermission.

4. The preparation according to claim 1, wherein each of said first and second matrix sheets is made of high-density polyethylene.

5. The preparation according to claim 1, wherein each of said first and second cooling rollers has a temperature of 5~20° C.

* * * * *